United States Patent [19]
Pilarzyk et al.

[11] Patent Number: 5,652,496
[45] Date of Patent: Jul. 29, 1997

[54] ELECTRICAL DEVICE HAVING A DISCRIMINATING, RECHARGEABLE BATTERY SYSTEM

[75] Inventors: James G. Pilarzyk, Madison; Upal Sengupta, Oregon; Steven R. Ruth, Madison, all of Wis.

[73] Assignee: Rayovac Corporation, Madison, Wis.

[21] Appl. No.: 606,015

[22] Filed: Feb. 12, 1996

[51] Int. Cl.⁶ .................................................. H02J 7/00
[52] U.S. Cl. .................... 320/2; 320/3; 320/4; 429/7; 429/178
[58] Field of Search .................. 320/2, 3–4, 15; 429/7, 178

[56] References Cited

U.S. PATENT DOCUMENTS

| | | | |
|---|---|---|---|
| 4,147,838 | 4/1979 | Leffingwell | 320/2 X |
| 4,489,268 | 12/1984 | Beachy | 320/2 |
| 4,577,144 | 3/1986 | Hodgman | 320/2 |
| 4,602,202 | 7/1986 | Mundschenk et al. | 320/2 |
| 4,628,243 | 12/1986 | Hodgman et al. | 320/2 |
| 4,645,996 | 2/1987 | Toops | 320/2 |
| 4,816,735 | 3/1989 | Cook et al. | 320/2 |
| 5,038,093 | 8/1991 | Edwards et al. | 320/2 |
| 5,057,761 | 10/1991 | Felegyhazi, Sr. | 320/2 |
| 5,108,847 | 4/1992 | Edwards et al. | 320/2 X |
| 5,443,924 | 8/1995 | Spellman | 429/65 |

Primary Examiner—Peter S. Wong
Assistant Examiner—K. Shin
Attorney, Agent, or Firm—Vedder, Price, Kaufman & Kammholz

[57] ABSTRACT

In accordance with the present invention, a portable electrical device with a discriminating, rechargeable battery system is provided. The rechargeable battery system includes a load circuit connected to a discharge contact adapted to electrically couple to an electrical terminal on a battery to receive power therefrom whereby either a first battery having a predetermined feature or a second battery lacking the predetermined feature may be coupled thereto. The system further includes a charger circuit connected to a charging contact adapted to electrically couple to the same electrical terminal on the battery to provide a charging current to the battery from an outside power source. An inhibitor is associated with the charger circuit and is adapted to cooperate with the predetermined feature to only allow the coupling of the charging contact with the electrical terminal of the first battery thereby preventing the coupling of the charging contact with the electrical terminal of the second battery. As such, only a battery having the predetermined feature may receive the charging current.

53 Claims, 2 Drawing Sheets

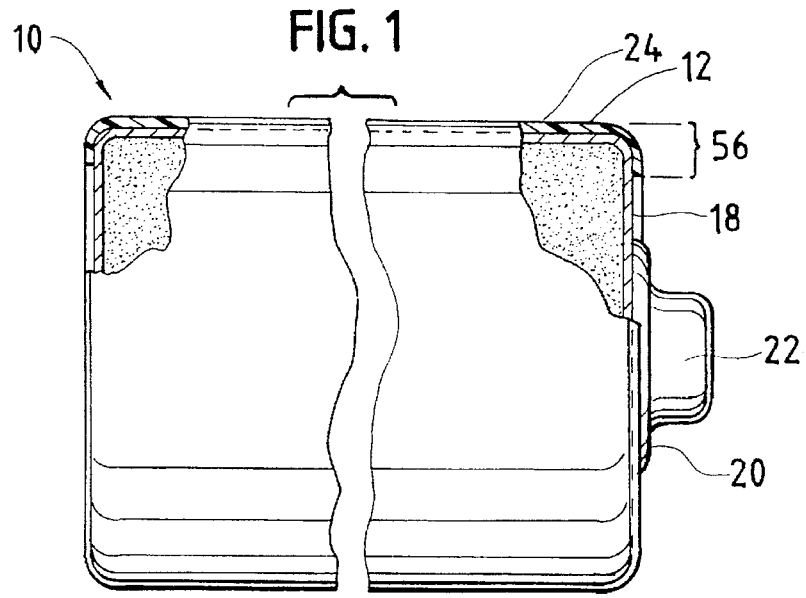
FIG. 1
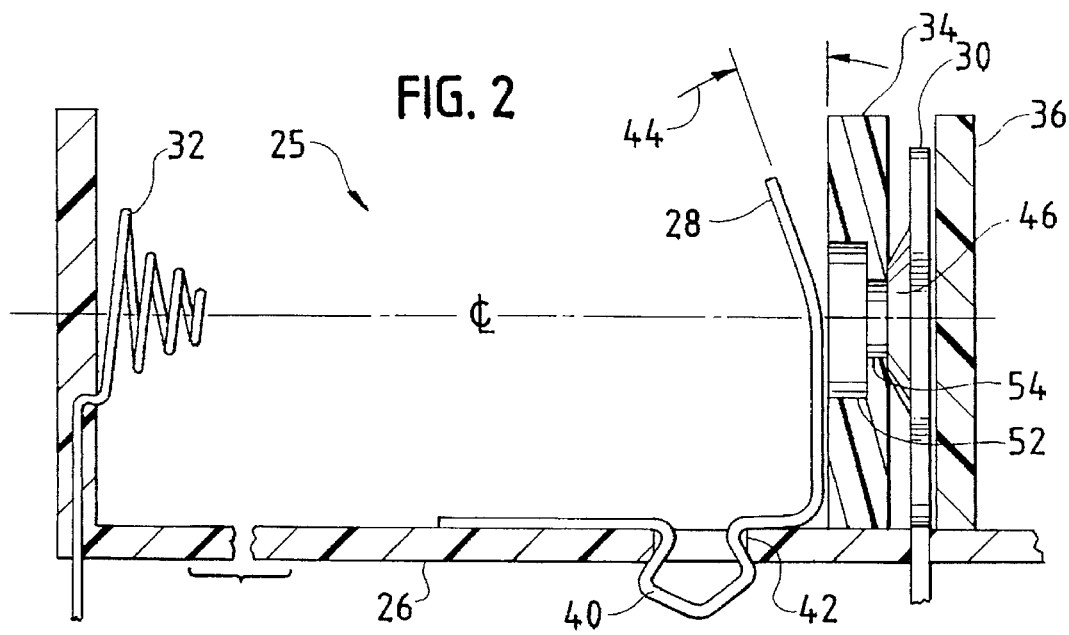
FIG. 2
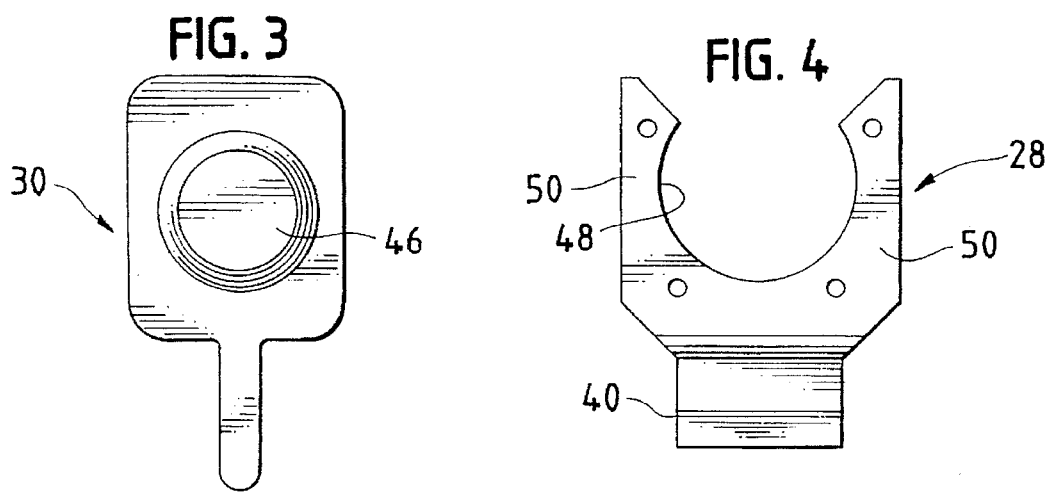
FIG. 3
FIG. 4

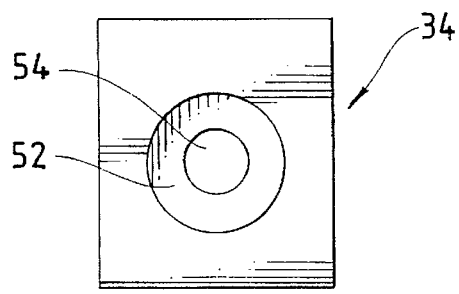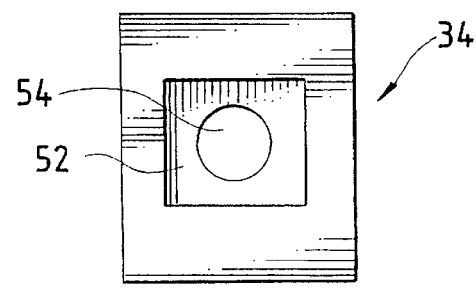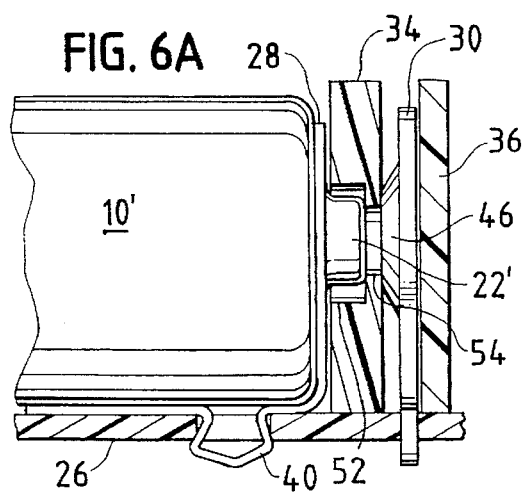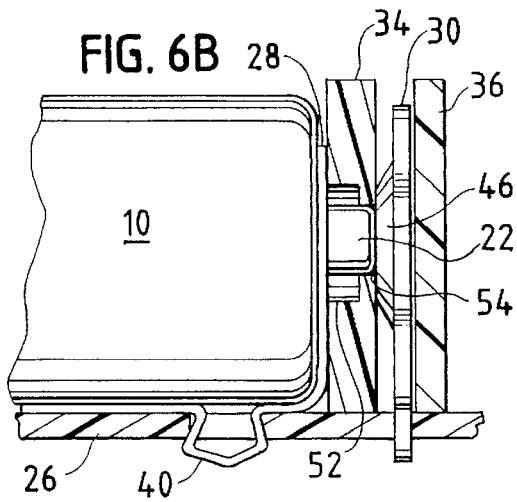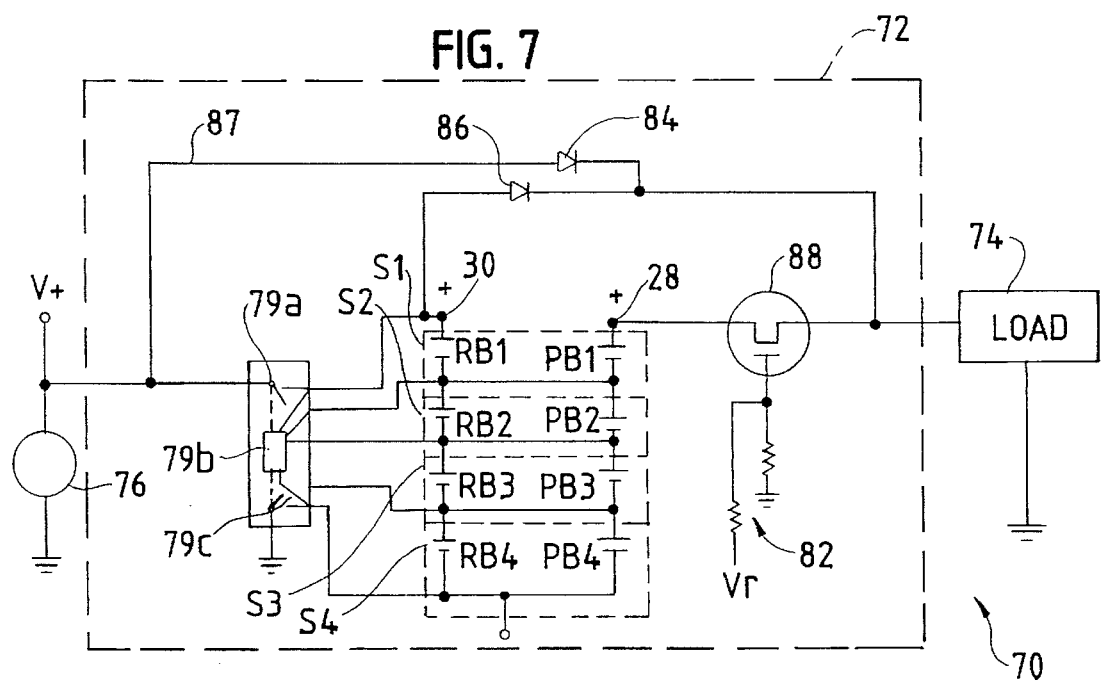

ELECTRICAL DEVICE HAVING A DISCRIMINATING, RECHARGEABLE BATTERY SYSTEM

This invention relates generally to rechargeable battery systems and, more particularly, relates to an electrical device having a discriminating, rechargeable battery system wherein either primary or secondary batteries are accepted for use in powering the device but only secondary batteries having a predetermined feature are capable of being recharged therein.

BACKGROUND OF THE INVENTION

For greater convenience and portability many modern electrical devices are designed to be powered by the electric current drawn from dry cells (commonly referred to as "batteries"). For convenience and economy, various rechargeable, or secondary, batteries have been developed for use in such devices. A number of stand alone chargers, separate from the electrical device itself, have been developed for the sole purpose of charging such secondary batteries through, for example, the use of conventional household current. However, due to differences in chemistry, non-rechargeable, or primary, batteries, such as zinc-carbon or manganese dioxide alkaline batteries, may leak, discharge gasses, or in some cases rupture, if subjected to a recharging current. Thus, for safety purposes, stand alone battery chargers are often provided with a means for discriminating between batteries which may be safely recharged therein, and those which may not.

With respect to stand alone battery chargers, there has been suggested different means for discriminating between batteries. Certain known stand alone battery chargers will accept both primary and secondary batteries but will prevent charging accidents by providing the chargers with an electrical circuit capable of distinguishing between batteries which should and should not be charged. Examples of such stand alone battery chargers are disclosed in U.S. Pat. Nos. 4,577,144, and 4,628,243.

Other known stand alone battery chargers are designed to be used with specially manufactured, rechargeable batteries having recharging contacts which are separate and apart from the normal positive and negative battery terminals. The specialized recharging contacts are cooperable only with corresponding charging contacts found in the charger. Thus, while both primary and secondary batteries may be inserted into the charger, only those batteries having the unique recharging contact will be subjected to the charging current. Examples of such stand alone battery chargers are disclosed in U.S. Pat. Nos. 4,489,268, 5,038,093, 5,108,847 and 5,443,924.

Still other known stand alone battery chargers are designed to accept only batteries provided with unique predetermined physical features, such as specialized cathode or anode terminals, whereby the battery charger is able to discriminate between batteries that should and should not be charged. Specifically, these battery chargers are designed to prevent the insertion therein of non-rechargeable batteries which lack the required physical attribute. Examples of such stand alone battery chargers are disclosed in U.S. Pat. Nos. 4,816,735 and 5,057,761 as well as copending U.S. application Ser. No. 08/278,505 entitled "DISCRIMINATING BATTERY CHARGING SYSTEM" by Spellman et al.

To further ease in the portability of electrical devices, many such devices are now designed with integral, rechargeable battery systems having dedicated, secondary batteries incorporated therein. Still other electrical devices have been designed with rechargeable battery systems capable of using either primary or secondary batteries as a source of power and, for the safety reasons previously discussed, are further provided with the ability to prevent the inadvertent charging of primary batteries should such batteries be utilized therein. Specific examples of such systems are disclosed in U.S. Pat. Nos. 4,147,838, 4,602,202, and 4,645,996. However, these known rechargeable battery systems have been found to be lacking from the combined standpoints of safety, cost, manufacturability, and ease of use.

Specifically, rechargeable battery systems currently in use in electrical devices are limited to systems designed solely for use in conjunction with batteries having separate charging contacts. These systems are undesirable due to the high cost of developing and manufacturing both the system and the batteries therefor. Therefore, a need exists for an electrical device having a rechargeable battery system capable of discriminating on a low cost basis between batteries that may be charged, and primary and/or secondary batteries that should not be charged.

What is also needed is an electrical device having a rechargeable battery system that is easy to use and consumer friendly. For example, it is desirous to provide an electrical device into which the consumer may simply place a battery without having to worry about the alignment of recharging contacts with corresponding charging contacts found in the rechargeable battery system.

As a result of these existing needs, it is an object of the present invention to provide an electrical device having a rechargeable battery system that will accept all batteries for use in powering the electrical device while allowing recharging current to be supplied only to batteries having a predimensioned or otherwise predetermined physical feature.

It is yet another object of the present invention to provide an electrical device having a rechargeable battery system that is simple to use and consumer friendly.

It is still another object of the present invention to provide an electrical device having a rechargeable battery system and batteries for use therein that are both simple and inexpensive to manufacture.

It is a further object of the present invention to provide an electrical device having an improved rechargeable battery system where the rechargeable battery system may be designed to be integral with the electrical device or separable therefrom, i.e. as a battery pack.

Other objects and advantages of the invention will become apparent from the detailed description which follows.

SUMMARY OF THE INVENTION

In accordance with the present invention, a portable electrical device with a discriminating, rechargeable battery system is provided. The system includes a load circuit connected to a discharge contact couplable to an electrical terminal on a battery to receive power therefrom and charger circuit connected to a charging contact couplable to the same electrical terminal of the battery to provide a charging current to the battery from an outside power source. An inhibitor associated with the charger circuit is cooperable with a predetermined feature of a battery to only allow the coupling of the charging contact with the electrical terminal of secondary batteries thereby preventing the coupling of the charging contact with the electrical terminal of primary batteries so that only a battery having the predetermined feature (i.e. a secondary battery) may receive the charging current.

In the preferred embodiment, a secondary battery is provided with a positive electrical terminal having a nubbin with a diameter smaller than that found in commonly used primary batteries, the inhibitor being configured to prevent contact between standard sized nubbins and the charging contact. The inhibitor comprises a barrier of nonconductive material having front and rear sides, a first opening extending partially therethrough sized and configured to accept conventionally sized nubbins, and a second opening extending completely therethrough sized and configured to accept only the smaller sized nubbin. The discharge contact is disposed on the front side of the inhibitor proximate to the first opening whereby the positive terminal base portions or lands of both a conventional battery and the secondary battery may be engaged thereby. The charging contact is disposed on the rear side of the inhibitor proximate to the second opening whereby the positive terminal of only the secondary battery may pass therethrough to access the charging contact.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the preferred embodiment shown in the following drawings in which:

FIG. 1 illustrates a side view of a battery;

FIG. 2 illustrates a side view of an arrangement of electrical contacts usable with the battery depicted in FIG. 1;

FIG. 3 illustrates a front view of the charging contact depicted in FIG. 2;

FIG. 4 illustrates a front view of the discharge contact depicted in FIG. 2;

FIGS. 5A and 5B illustrate front views of alternative configurations of the inhibitor depicted in FIG. 2;

FIG. 6A illustrates a side view of the rechargeable battery system of the present invention being utilized with an unacceptable battery;

FIG. 6B illustrates a side view of the rechargeable battery system of the present invention being utilized with an acceptable battery; and FIG. 7 illustrates in partial schematic and block diagram form the rechargeable battery system of the present invention.

DETAILED DESCRIPTION

While the teachings of the present invention can be used in conjunction with numerous battery types it will be described hereinafter in the context of cylindrical C-sized or D-sized batteries.

Referring now to the Figures, wherein like reference numerals refer to like elements, there is shown in FIG. 1 a cylindrical secondary or rechargeable battery 10 which is to be used in combination with a rechargeable battery system in a portable electrical device described hereinafter. The battery 10 generally comprises a casing 12 with a positive terminal 14 at one end and a negative terminal 16 at the other end. The positive terminal 14 has an annular, planar base 18 with a ridge 20 and a centrally located nubbin 22 protruding therefrom. The nubbin 22 is designed to have a diameter which substantially corresponds to the minimal diameter allowed by ANSI specifications. ANSI specifies a range for nubbin diameters between 0.217 inches and 0.295 inches for C sized batteries (ANSI C18.1M-1992 at 20-1031-1969) and between 0.307 inches and 0.374 inches for D-sized batteries (ANSI C18.1M-1992 at 20-1346-2421. An electrically insulative jacket or label 24 surrounds the case 12 and extends over a portion of the positive terminal 14 from the positive terminal outer perimeter.

FIG. 2 illustrates a battery receptacle 25 into which the battery 10 is placed. The components of the reciptical 25 are mounted to a non-conductive substrate or support 26 and include a dual positive contact assembly 27, comprised of a discharge contact 28, a charging contact 30, and a nubbin inhibitor 34 (comprising a non-conductive barrier member), and a negative contact 32. The negative contact 32 may be a standard, spring type contact as shown or other type capable of urging a battery disposed within the receptical into engagement with the dual positive contact assembly 27. In the illustrated embodiment, the discharge contact 28 and the charging contact 30 are separated by the non-conductive nubbin inhibitor 34. Specifically, the charging contact 30 is disposed at the rear side of the nubbin inhibitor 34 and is supported by a non-conductive wall 36 while the discharge contact 28 is disposed at the front side of the nubbin inhibitor 34 and is anchored via a spring/clip anchor 40 which is inserted into a cooperating opening 42 in the substrate 26. The discharge contact 28 is shown positioned at a slight angle θ relative to the nubbin inhibitor 34 for cooperating with the negative contact 32 to provide a compression fit for a battery inserted therebetween.

As shown in FIGS. 2 and 3, the charging contact 30 is preferably constructed to include a generally frusto conically shaped contact surface 46 for engaging the end of a battery nubbin. As best shown in FIGS. 2 and 4, the discharge contact 28 is constructed as a thin, plate-like planar strip which includes a substantially circular cutout 48 between two upwardly extending arms 50. The circular cutout 48 is sized and configured to be slightly larger than the largest nubbin diameter allowed under ANSI specifications. Preferably, the charging contact 30 and the discharging contact 28 are constructed from common battery terminal materials such as phosphor bronze or beryllium copper.

With reference to FIGS. 2, 5A, and 5B, the nubbin inhibitor 34 is constructed to include two openings 52,54 therein. The first opening 52, which may be circular, square, or the like, is sized and configured to accept any battery nubbin having a diameter within ANSI specifications. The depth of the first opening 52 extends only partially into the nubbin inhibitor 34. The second opening 54, which is preferably of circular configuration, is sized and configured to accept only a battery nubbin having a diameter which is at the minimum end of the ANSI specifications. The second opening 54 extends entirely through the nubbin inhibitor 34 and is in alignment with the contact surface 46 of charging contact 30. Opening 54 is further sized and configured to guide the tip of the minimum diameter nubbin therethrough under the urging of the negative contact 32 whereby contact with the charging contact 30 is made.

As illustrated in FIGS. 6A and 6B, the arrangement of the dual positive contact functions to prevent the positive terminal of a common primary battery 10', having a nubbin with a diameter larger than afforded to secondary battery 10, from making contact with the charging contact 30. Particularly, the nubbin of the battery 10' is accepted into the first opening 52 but, owing to its size, is inhibited from passing through the second opening 54 behind which the charging contact 30 is positioned.

As illustrated in Tables 1 and 2 and as described in copending U.S. application Ser. No. 08/278,505, entitled "DISCRIMINATING BATTERY CHARGING SYSTEM" by Spellman et al., the disclosure of which is incorporated herein by reference in its entirety, the nubbins of all commonly used batteries are constructed with nubbin diameters which do not approach the minimal diameter allowed under ANSI specifications.

TABLE 1

PRIOR ART NUBBIN DIAMETERS OF C-SIZED BATTERIES

| BATTERY TYPE | MANUFACTURER | MODEL NUMBER | DIAMETER IN INCHES |
| --- | --- | --- | --- |
| PRIMARY ALKALINE | RAYOVAC | 814 | 0.2585 |
| PRIMARY ALKALINE | DURACELL | MN1400 | 0.2490 |
| PRIMARY ALKALINE | EVEREADY | E93 | 0.2313 |
| PRIMARY ALKALINE | KODAK | KC | 0.2355 |
| PRIMARY ALKALINE | PANASONIC | LR-14 (PG) | 0.2480 |
| RECHARGEABLE NICKEL-CAD. | RAYOVAC | 614 | 0.2485 |
| RECHARGEABLE NICKLE-CAD. | SANYO | N-1800C | 0.2760 |

TABLE 2

PRIOR ART NUBBIN DIAMETERS OF D-SIZED BATTERIES

| BATTERY TYPE | MANUFACTURER | MODEL NUMBER | DIAMETER IN INCHES |
| --- | --- | --- | --- |
| PRIMARY ALKALINE | RAYOVAC | 813 | 0.3400 |
| PRIMARY ALKALINE | DURACELL | MN1300 | 0.3205 |
| PRIMARY ALKALINE | EVEREADY | E95 | 0.3277 |
| PRIMARY ALKALINE | KODAK | KD | 0.3375 |
| PRIMARY ALKALINE | PANASONIC | LR-20 (PG) | 0.3515 |
| RECHARGEABLE NICKEL-CAD. | GATES | BD | 0.3410 |
| RECHARGEABLE NICKEL-CAD. | RAYOVAC | 613 | 0.3395 |
| RECHARGEABLE NICKLE-CAD. | SANYO | N-4000D | 0.3130 |

Therefore, the nubbins of these batteries will not be able to achieve contact with the charging contact 30. Nevertheless, while only secondary batteries having the predetermined, minimal nubbin diameter are allowed to make contact with the charging contact 30 through the second opening 54, the positive terminals of all batteries constructed within ANSI specifications will be able to engage the discharge contact 28, and hence supply power to the electrical device, when the nubbin of the battery is forced into the nubbin inhibitor 34. This result is achieved owing to the placement of the discharge contact 28 in front of the nubbin inhibitor 34.

In particular, with reference to FIGS. 1, 4, and 6, it is seen that the positive terminal of a battery having any nubbin size will be forced into contact with the discharge terminal 28 when the battery nubbin is urged into opening 52 of the nubbin inhibitor 34. More specifically, as the negative contact 32 forces the battery nubbin into opening 52 of the nubbin inhibitor 34, the battery nubbin will pass through the cutout 48 in the discharge terminal 28 so that the arms 50 of the discharge contact 28 will engage the positive terminal of the battery. In the illustrated embodiment, the arms 50 of the discharge contact 28 will engage the positive terminal 14 of the battery 10 at locations along the side of the nubbin 22, the ridge 20, and/or the planar base 18. It is to be noted that the arms 50 of the discharge contact 28 should be sized and shaped to avoid contact with the label overwrap area 56 of the cell which would impede the metal-to-metal contact necessary for discharge.

FIG. 7 illustrates a portable electrical device 70 constructed in accordance with the present invention. The device 70 includes, by way of example only, a rechargeable battery system 72 having four battery accepting slots S1–S4. The battery system 72 may be integrally disposed within the electrical device or it may be separably electrically connectable to the electrical device as, for example, a battery pack. The four cell system 72 is constructed in accordance with the preceding description and includes the dual positive contact. As such, all types of batteries (depicted as batteries PB1–PB4 in FIG. 7) may be used within the system to supply power to the device (load 74) via discharge contact 28. However, only secondary batteries (depicted as batteries RB1–RB4 in FIG. 7) capable of coupling with the charging terminal 30 through the inhibitor 34 are capable of having charging current supplied thereto. It is to be understood that only one battery, either a rechargeable battery RB or primary battery PB, will occupy each of the four battery slots S1–S4 provided in the device. Furthermore, while in the illustrated embodiment only one dual contact is provided whereby the lead battery, either RB1 or PB1 located in battery slot S1, determines which of the contacts 28,30 are coupled with, it is contemplated that each battery slot in the device may be provided with a dual contact whereby all batteries placed within the system would be subjected to the safety features associated therewith.

The device 70 is connectable to an electrical power supply 76, such as a 7–10 volt, 200–300 milliAmp dc source which may be obtained, for example, from rectified, stepped down common household ac power. The power supply 76 is used for supplying power to the load and/or for supplying recharging current to the batteries RB1–RB4. An example of a charging circuit usable in connection with the present invention may be found in copending application Ser. No. 08/519,689 entitled "BATTERY MANAGEMENT CIRCUIT AND METHOD FOR CONTROLLING THE IN-CIRCUIT CHARGE AND DISCHARGE OF SERIES-CONNECTED RECHARGEABLE ELECTROCHEMICAL CELLS" by Upal Sengupta et al., the disclosure of which is incorporated herein by reference in its entirety. Generally, the rechargeable battery system 72 associated with device 70 includes a switching and control circuit 78, which may be an integrated circuit. The circuit 78 contains a high-side switch 79a, a low side switch 79c, and a monitor/control section 79b. The control section 79b controls the flow of charge current to the cells RB1–RB4. During charge or discharge, the low side switch 79c must also be activated. When a low-cell-voltage condition is sensed by the control section 79b, the low-side switch 79c is disconnected in order to prevent excessive discharge of any cells.

In the illustrated embodiment, the dc power source 76 is also connected to the load 74 whereby the power source 76 may further be used to power the device while concurrently supplying recharging current to the rechargeable batteries RB1–RB4. Optionally, the charging contact 30 may also be connected to the load 74 for the purpose of allowing batteries RB1–RB4 to supply power thereto. However, when the charging contact 30 is tied to the load 74, it is preferred that a first steering diode 84 and second steering diode 86 be utilized to isolate and protect the batteries and the power supply 76 from each other. While not illustrated, it is contemplated that the system could be configured such that the dc power source 76 is isolated from the load 74 whereby the power source 76 is used only for recharging the batteries RB1–RB4 and the load 74 is powered only by the batteries connected thereto by discharge contact 28 and, optionally, charging contact 30. Such a system may be realized by removing electrical lead 87 and diode 84 from the circuit and replacing diode 86 by a short circuit.

As illustrated in FIG. 7, the discharge contact 28 is connected to the load 74 through a transistor 88 for use in powering the device when the device is not connected to an outside power source. Specifically, the primary positive contact of the lead battery in the series, battery PB1 or RB1, is connected to the load through transistor 88. A pull-up resistor circuit 88 is used to control the operation of the transistor 88 such that when V+ is disconnected from the pull-up resistor circuit 82 the transistor 88 is turned ON closing the circuit whereby discharge of the cells is permitted. However, when V+ is present and applied to the pull-up resistor circuit 82, the transistor 88 is turned OFF and the batteries are accordingly disconnected from the load 74. It is further seen that the turning OFF of the transistor 88 also prevents the flow of current to any cell in contact with discharge contact 28.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. An electrical device for use with a first battery having an electrical terminal that includes a predetermined feature or a second battery having an electrical terminal lacking said predetermined feature, comprising:

a load circuit;

a discharge contact connectable to said load circuit and couplable with said electrical terminal of either said first battery or said second battery;

a charger circuit;

a charging contact connectable to said charger circuit and couplable with said electrical terminal of said first battery to allow a charging current to be provided to said first battery from an outside power source; and an inhibitor cooperable with said predetermined feature to allow the coupling of said charging contact with said electrical terminal of said first battery and to prevent the coupling of said charging contact with said electrical terminal of said second battery whereby only said first battery may receive said charging current.

2. The electrical device as recited in claim 1, wherein said inhibitor is disposed between said discharge contact and said charging contact.

3. The electrical device as recited in claim 1, wherein said inhibitor comprises a barrier of non-conductive material having an opening therethrough sized and configured to accept passage of said predetermined feature.

4. The electrical device as recited in claim 1, wherein said inhibitor has a first opening extending partially therethrough sized and configured to accept said electric terminal of said second battery and a second opening extending completely therethrough sized and configured to accept said electric terminal of said first battery.

5. The electrical device as recited in claim 4, wherein said second opening is smaller in size than said first opening and said second opening is disposed proximate to the center of said first opening.

6. The electrical device as recited in claim 5, wherein said discharge contact is disposed on a first side of said inhibitor proximate to said first opening and said charging contact is disposed on an opposite side of said inhibitor proximate to said second opening.

7. The electrical device as recited in claim 6, wherein said discharge contact comprises a planar plate having a cutout portion between a pair of extending side arms and wherein said cutout portion substantially, coaxially aligns with said first opening.

8. The electrical device as recited in claim 1, further comprising a first casing in which said load circuit is housed and a second casing in which said charger circuit is housed.

9. The electrical device as recited in claim 8, wherein said discharge contact, charging contact, and inhibitor comprise a dual contact, said dual contact being housed in said second casing and separable from said load circuit, and wherein said second casing is separable from said first casing.

10. The electrical device as recited in claim 1, wherein said load circuit is connected to selectively accept power from said outside power source, said charger circuit selectively supplying said charging current to said first battery concurrently with said load circuit accepting power from said outside power source.

11. A discriminating, rechargeable battery system for use in an electrical device, comprising:

a first battery having a predetermined feature;

a load circuit;

a discharge contact coupled to said load circuit and to either an electrical terminal of said first battery or an electrical terminal of a second battery lacking said predetermined feature;

a charger circuit;

a charging contact coupled to said charger circuit and to said electric terminal to provide a charging current thereto from an outside power source; and an inhibitor associated with said charger circuit adapted to cooperate with said predetermined feature to allow the coupling of said charging contact with said electrical terminal of said first battery and to prevent the coupling of said charging contact with said electrical terminal of said second battery whereby only said first battery may receive said charging current.

12. The system as recited in claim 11, wherein said inhibitor is disposed between said discharge contact and said charging contact.

13. The system as recited in claim 11, wherein said inhibitor has an opening therethrough which is sized and configured to accept said predetermined feature.

14. The system as recited in claim 13, wherein said predetermined feature of said first battery comprises a positive terminal having a nubbin of predetermined diameter.

15. The system as recited in claim 14, wherein said discharge contact is disposed on a side of said inhibitor proximate to said battery and said charging contact is disposed on an opposite side of said inhibitor removed from said battery.

16. The system as recited in claim 15, further comprising a spring contact connectable with both said load circuit and said charger circuit, said spring contact urging either said first battery or said second battery into engagement with said inhibitor.

17. The system as recited in claim 16, wherein said predetermined feature of said first battery comprises a positive terminal that includes a nubbin having a first diameter.

18. The system as recited in claim 17, wherein said second battery includes a nubbin having a second diameter larger than said first diameter and said inhibitor has a first opening extending partially therethrough sized and configured to accept the nubbin of said second battery and a second opening extending completely therethrough sized and configured to accept passage of the nubbin of said first battery.

19. The system as recited in claim 18, wherein said discharge contact is disposed on a first side of said inhibitor proximate to said first opening and said charging contact is disposed on an opposite side of said inhibitor proximate to said second opening.

20. The system as recited in claim 19, wherein said discharge contact comprises a metallic plate having a cutout portion flanked by a pair of extending side arms, said cutout portion being substantially coaxially aligned with said first opening.

21. The system as recited in claim 20 wherein said discharge contact is disposed at an angle relative to said inhibitor and cooperable with said spring contact to engage said battery therebetween.

22. A battery receptacle for use with a first battery having a predetermined feature or a second battery lacking said predetermined feature, comprising:
a non-conductive support;
a discharge contact mounted to said support adapted to electrically couple to an electrical terminal of either said first battery or said second battery;
a charging contact mounted to said support adjacent said discharge contact; and
an inhibitor mounted to said support and disposed between said discharge contact and said charging contact, said inhibitor being cooperable with said predetermined feature to allow the coupling of said charging contact with the electrical terminal of said first battery and to prevent the coupling of said charging contact with said electrical terminal of said second battery.

23. The battery receptacle as recited in claim 22, wherein said inhibitor comprises a barrier of non-conductive material.

24. The battery receptacle as recited in claim 22, wherein said inhibitor has an opening therethrough sized and configured to accept said predetermined feature.

25. The battery receptacle as recited in claim 22, wherein said inhibitor has a first opening extending partially therethrough sized and configured to accept the electric terminal of said second battery and a second opening extending completely therethrough sized and configured to accept only the electric terminal of said first battery.

26. The battery receptacle as recited in claim 25, wherein said second opening is smaller in size than said first opening, said second opening being disposed proximate to the center of said first opening.

27. The battery receptacle as recited in claim 26, wherein said discharge contact is disposed on a first side of said inhibitor proximate to said first opening and said charging contact is disposed on an opposite side of said inhibitor proximate to said second opening.

28. The battery receptacle as recited in claim 27, wherein said discharge contact comprises a conductive plate having a cutout portion flanked by a pair of extending side arms and wherein said cutout portion substantially coaxially aligns with said first opening.

29. A battery receptacle for use with a plurality of first batteries each having a predetermined feature and a plurality of second batteries each lacking said predetermined feature, comprising:
a non-conductive support forming a plurality of battery accepting slots each capable of accepting therein one of said plurality of first batteries or one of said plurality of second batteries, at least one of said plurality of battery accepting slots having a discharge contact mounted to said non-conductive support, said discharge contact being adapted to electrically couple to an electrical terminal of either one of said plurality of first batteries or one of said plurality of second batteries which may be disposed within said one of said plurality of battery accepting slots;
a charging contact mounted to said non-conductive support; and
an inhibitor associated with said charging contact and cooperable with said predetermined feature to permit coupling of said charging contact with said electrical terminal of said one of said plurality of first batteries and to prevent coupling of said charging contact with said electrical terminal of said one of said plurality of second batteries.

30. The battery receptacle as recited in claim 29, wherein said inhibitor is disposed between said discharge contact and said charging contact.

31. The battery receptacle as recited in claim 29, wherein said inhibitor has an opening therethrough which is sized and configured to accept said predetermined feature.

32. The battery receptacle as recited in claim 29, wherein said inhibitor has a first opening extending partially therethrough sized and configured to accept the electric terminal of said one of said plurality of second batteries and a second opening extending completely therethrough sized and configured to accept the electric terminal of said one of said plurality of first batteries.

33. The battery receptacle as recited in claim 32, wherein said second opening is smaller in size than said first opening and said second opening is disposed proximate to the center of said first opening.

34. The battery receptacle as recited in claim 33, wherein said discharge contact is disposed on a first side of said inhibitor proximate to said first opening and said charging contact is disposed on an opposite side of said inhibitor proximate to said second opening.

35. The battery receptacle as recited in claim 34, wherein said discharge contact comprises a planar plate having a cutout portion between a pair of extending side arms and wherein said cutout portion substantially, coaxially aligns with said first opening.

36. The battery receptacle as recited in claim 35, wherein said discharge contact further comprises a spring member cooperable with an opening in said non-conductive support for use in mounting said discharge contact to said non-conductive support.

37. The battery receptacle as recited in claim 36, further comprising a non-conductive wall associated with said non-conductive support and wherein said charging contact is mounted to said non-conductive wall.

38. The combination with a battery having a negative terminal at one end and a positive terminal at its opposed end, said positive terminal including a nubbin; of
a battery receptacle having a negative terminal contact couplable with said negative terminal, first and second positive terminal contacts couplable with said positive terminal, and an inhibitor disposed between said first and second positive terminal contacts, said inhibitor being configured to prevent the coupling of said second positive terminal contact and said positive terminal unless said nubbin has a predetermined configuration.

39. The combination as recited in claim 38, wherein said predetermined configuration comprises a nubbin of predetermined diameter.

40. The combination as recited in claim 39, wherein said inhibitor comprises a non-conductive wall having an opening extending partially therethrough sized and configured to accept passage of a nubbin having said predetermined diameter.

41. The combination as recited in claim 40, wherein said inhibitor is disposed between said first and second positive terminal contacts.

42. The combination as recited in claim 41, wherein said negative terminal contact is adapted to urge said battery into engagement with said first positive terminal contact and said inhibitor.

43. The combination as recited in claim 42, wherein said first positive terminal contact is adapted to cooperate with said negative terminal contact to maintain said battery therebetween.

44. The electrical device as recited in claim 1, further comprising a switch for disconnecting said discharge contact from said load circuit when said outside power source is utilized to power said device.

45. The electrical device as recited in claim 44, wherein said switch comprises a transistor.

46. The electrical device as recited in claim 11, further comprising a switch for disconnecting said discharge contact from said load circuit when said outside power source is utilized to power said device.

47. The electrical device as recited in claim 46, wherein said switch comprises a transistor.

48. The electrical device as recited in claim 1, wherein said load circuit is coupled to a plurality of discharge contacts, said charger circuit being coupled to a plurality of charging contacts, and each of said charging contacts has an inhibitor associated therewith, whereby a plurality of said first batteries or said second batteries may be disposed within said electrical device.

49. The electrical device as recited in claim 48, further comprising a switching circuit connected to said plurality of charging contacts for use in limiting the providing of said charging current to a preselected number of said plurality of first batteries over a period of time.

50. The electrical device as recited in claim 49, wherein only one of said plurality of first batteries is provided said charging current over said period of time.

51. The battery system as recited in claim 11, wherein said load circuit is coupled to a plurality of discharge contacts, said charger circuit being coupled to a plurality of charging contacts, and each of said charging contacts has an inhibitor associated therewith whereby a plurality of said first batteries or said second batteries may be disposed within said electrical device.

52. The battery system as recited in claim 51, further comprising a switching circuit connected to said plurality of charging contacts for use in selectively limiting said charging current to a preselected number of said plurality of first batteries over a period of time.

53. The battery system as recited in claim 52, wherein only one of said plurality of first batteries is provided said charging current over said period of time.

* * * * *